United States Patent
Reiderman et al.

(10) Patent No.: US 9,354,347 B2
(45) Date of Patent: May 31, 2016

(54) METHOD AND APPARATUS FOR DEEP TRANSIENT RESISTIVITY MEASUREMENT WHILE DRILLING

(71) Applicants: Arcady Reiderman, Katy, TX (US); Sushant M. Dutta, Houston, TX (US)

(72) Inventors: Arcady Reiderman, Katy, TX (US); Sushant M. Dutta, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 695 days.

(21) Appl. No.: 13/713,662

(22) Filed: Dec. 13, 2012

(65) Prior Publication Data
US 2014/0172304 A1   Jun. 19, 2014

(51) Int. Cl.
*G01V 3/34* (2006.01)
*G01V 3/20* (2006.01)

(52) U.S. Cl.
CPC .... *G01V 3/20* (2013.01); *G01V 3/34* (2013.01)

(58) Field of Classification Search
CPC ........................................................ G01V 3/34
USPC ............................................................ 702/7
See application file for complete search history.

(56) References Cited

U.S. PATENT DOCUMENTS

| | | |
|---|---|---|
| 4,796,186 A | 1/1989 | Kaufman |
| 4,882,542 A | 11/1989 | Vail, III |
| 5,038,107 A | 8/1991 | Gianzero et al. |
| 5,089,779 A | 2/1992 | Rorden |
| 5,103,919 A | 4/1992 | Warren et al. |
| 5,159,577 A | 10/1992 | Twist |
| 5,259,468 A | 11/1993 | Warren et al. |
| 5,452,761 A | 9/1995 | Beard et al. |
| 5,883,515 A | 3/1999 | Strack et al. |
| 6,218,842 B1 | 4/2001 | Bittar et al. |
| 6,541,975 B2 | 4/2003 | Strack |
| 6,891,376 B2 | 5/2005 | Hanstein et al. |

(Continued)

FOREIGN PATENT DOCUMENTS

| | | |
|---|---|---|
| CN | 201232545 Y | 5/2009 |
| WO | 97/49889 | 12/1997 |
| WO | 2012129058 A2 | 9/2012 |

OTHER PUBLICATIONS

Draper et al. "Applied Regression Analysis", Chapter 10, An Introduction to Nonlinear Estimation, 1981 John Wiley & sons, 2nd Edition, pp. 458-464.

(Continued)

*Primary Examiner* — Bryan Bui
(74) *Attorney, Agent, or Firm* — Cantor Colburn LLP

(57) ABSTRACT

A method for estimating a property of an earth formation penetrated by a borehole includes conveying a drill tubular through the borehole and transmitting a signal into the formation with a transmitter transducer disposed at the drill tubular. The method further includes receiving a first signal with a first receiver transducer having a sensitivity oriented in a first direction and disposed an axial distance from the transmitter transducer and receiving a second signal with a second receiver transducer having a sensitivity oriented in a second direction different from the first direction and disposed an axial distance from the transmitter transducer. The method also includes calculating a corrected signal that corrects for at least one of bending and torsion of the drill tubular between the transmitter transducer and the first and second receiver transducers using the first signal and the second signal and estimating the property using the corrected signal.

20 Claims, 8 Drawing Sheets

(56) References Cited

U.S. PATENT DOCUMENTS

| | | | |
|---|---|---|---|
| 6,914,433 B2 | 7/2005 | Wright et al. | |
| 6,998,844 B2 | 2/2006 | Omeragic et al. | |
| 7,027,922 B2 | 4/2006 | Bespalov et al. | |
| 7,046,009 B2 | 5/2006 | Itskovich | |
| 7,066,280 B2 | 6/2006 | Sullivan et al. | |
| 7,150,316 B2 | 12/2006 | Itskovich | |
| 7,167,006 B2 | 1/2007 | Itskovich | |
| 7,257,489 B2 | 8/2007 | Hsu et al. | |
| 7,366,616 B2 | 4/2008 | Bennett et al. | |
| 7,502,690 B2 | 3/2009 | Thomsen et al. | |
| 7,541,813 B2 | 6/2009 | Synder, Jr. et al. | |
| 7,583,085 B2 | 9/2009 | Hall et al. | |
| 7,654,340 B2 | 2/2010 | Self et al. | |
| 7,659,723 B2 | 2/2010 | Meyer et al. | |
| 8,239,172 B2 | 8/2012 | Reiderman et al. | |
| 2002/0173913 A1* | 11/2002 | Tabarovsky et al. | 702/7 |
| 2004/0098201 A1 | 5/2004 | Tabarovsky | |
| 2005/0024060 A1 | 2/2005 | Bittar | |
| 2005/0092487 A1 | 5/2005 | Banning et al. | |
| 2006/0061364 A1 | 3/2006 | Banning et al. | |
| 2006/0186887 A1 | 8/2006 | Strack et al. | |
| 2007/0108981 A1 | 5/2007 | Banning-Geertsma et al. | |
| 2007/0168133 A1 | 7/2007 | Bennett et al. | |
| 2007/0216416 A1 | 9/2007 | Itskovich | |
| 2007/0256832 A1 | 11/2007 | Hagiwara et al. | |
| 2008/0258733 A1 | 10/2008 | Bittar | |
| 2009/0216454 A1 | 8/2009 | Ziolkowski et al. | |
| 2009/0237084 A1 | 9/2009 | Itskovich et al. | |
| 2009/0243618 A1 | 10/2009 | Wang et al. | |
| 2010/0097065 A1 | 4/2010 | Itskovich et al. | |
| 2010/0100329 A1 | 4/2010 | Ekseth et al. | |
| 2010/0109672 A1 | 5/2010 | Rabinovich et al. | |
| 2010/0109905 A1 | 5/2010 | Itskovich | |
| 2010/0125439 A1* | 5/2010 | Reiderman | G01V 3/28 702/195 |
| 2010/0305864 A1 | 12/2010 | Gies | |
| 2011/0012602 A1 | 1/2011 | Reiderman et al. | |
| 2011/0257886 A1 | 10/2011 | Itskovich et al. | |
| 2012/0105076 A1 | 5/2012 | Li et al. | |
| 2012/0242342 A1* | 9/2012 | Rabinovich et al. | 324/338 |
| 2012/0247833 A1 | 10/2012 | Ekseth et al. | |
| 2013/0297214 A1* | 11/2013 | Reiderman | G01V 3/38 702/7 |

OTHER PUBLICATIONS

Liu, Electromagnetic Logging Technique Based on Borehole Radar, Sep. 2002, vol. 40, No. 9. IEEE Transactions on Geoscience and Remote Sensing.

Notification of Transmittal of the International Search Report and the Written Opinion of the International Searching Authority, or the Declaration; PCT/US2013/074240; Mailed Mar. 13, 2014, 14 pages.

Notification of Transmittal of the International Search Report and the Written Opinion of the International Searching Authority, or the Declaration; PCT/US2013/038213; Aug. 13, 2013, 9 pages.

* cited by examiner

METHOD AND APPARATUS FOR DEEP TRANSIENT RESISTIVITY MEASUREMENT WHILE DRILLING

BACKGROUND

Earth formations may be used for various purposes such as hydrocarbon production, geothermal production, and carbon dioxide sequestration. In order to efficiently use an earth formation, the formation is characterized by performing measurements of many different properties. One type of measurement is formation resistivity or its inverse conductivity. Resistivity measurements may be performed by a resistivity logging tool that is disposed in a borehole penetrating the formation. In logging-while-drilling applications, the logging tool is connected to a drill string and the measurements are performed while the borehole is being drilled.

Induction resistivity measurements may be performed by transmitting electromagnetic signals into a formation from a transmitter antenna and receiving corresponding electromagnetic signals that were modified by the formation with a receiver antenna. The received signals include information that is used to determine the formation resistivity. The receiver antenna and the transmitter antenna, while connected to the same drill string, are spaced a distance from each other. Unfortunately, as the borehole is being drilled, the drill pipes making up the drill string can undergo torsion and bending causing the alignment between the transmitter antenna and the receiver antenna to change. The misalignment and bending introduce an additional angle between transmitter and receiver such that they are no longer in the original alignment, which produces parasitic coupling and associated signals. These parasitic signals make it difficult or impossible to acquire any reliable directional measurements including direction and distance to bed or resistivity anisotropy measurement. Accordingly, any change in the alignment, either from bending and/or torsion, can cause the resistivity data to be corrupted or loose accuracy. Hence, it would be well received in the drilling and geo-physical exploration industries if resistivity logging tools could be improved to correct for drill string torsion and bending.

BRIEF SUMMARY

Disclosed is a method for estimating a property of an earth formation penetrated by a borehole. The method includes: conveying a drill tubular through the borehole; transmitting a signal into the formation with a transmitter transducer disposed at the drill tubular; receiving a first signal with a first receiver transducer having a sensitivity oriented in a first direction and disposed an axial distance from the transmitter transducer; receiving a second signal with a second receiver transducer having a sensitivity oriented in a second direction different from the first direction and disposed an axial distance from the transmitter transducer; calculating a corrected signal that corrects for at least one of bending and torsion of the drill tubular between the transmitter transducer and the first and second receiver transducers using the first signal and the second signal; and estimating the property using the corrected signal.

Also disclosed is an apparatus for estimating a property of an earth formation penetrated by a borehole. The apparatus includes: a drill tubular configured to be conveyed through the borehole; a transmitter transducer disposed at the drill tubular and configured to transmit a signal towards the earth formation; a first receiver transducer disposed at the drill tubular a first axial distance from the transmitter transducer, having a first direction of sensitivity, and configured to receive a first signal related a transmission signal; a second receiver transducer disposed at the drill tubular a second axial distance from the transmitter transducer that is less than the first axial distance, having a second direction of sensitivity that is different from the first direction of sensitivity, and configured to receive a second signal related to the transmission signal; and a processor configured to calculate a corrected signal that corrects for at least one of bending and torsion of the drill tubular between the transmitter transducer and the first and second receiver transducers using the first signal and the second signal, and to estimate the property using the corrected signal.

Further disclosed is a non-transitory computer-readable medium having computer-executable instructions for estimating a property of an earth formation penetrated by a borehole by implementing a method. The method includes transmitting a signal into the formation with a transmitter transducer disposed at a drill tubular disposed in the borehole; receiving a first signal with a first receiver transducer having a sensitivity oriented in a first direction and disposed an axial distance from the transmitter transducer; receiving a second signal with a second receiver transducer having a sensitivity oriented in a second direction different from the first direction and disposed an axial distance from the transmitter transducer; calculating a corrected signal that corrects for at least one of bending and torsion of the drill tubular between the transmitter transducer and the first and second receiver transducers using the first signal and the second signal; and estimating the property using the corrected signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Disclosed are method and apparatus for estimating a property of an earth formation using logging-while-drilling (LWD) sensors disposed at a drill string and correcting for bending or torsion (i.e., twisting) of the drill string to provide measurements having increased accuracy and precision. Outputs from two or more sensors measuring the property are provided to a processor that computes a corrected signal related to the property that corrects for the bending or torsion.

Figure 1:
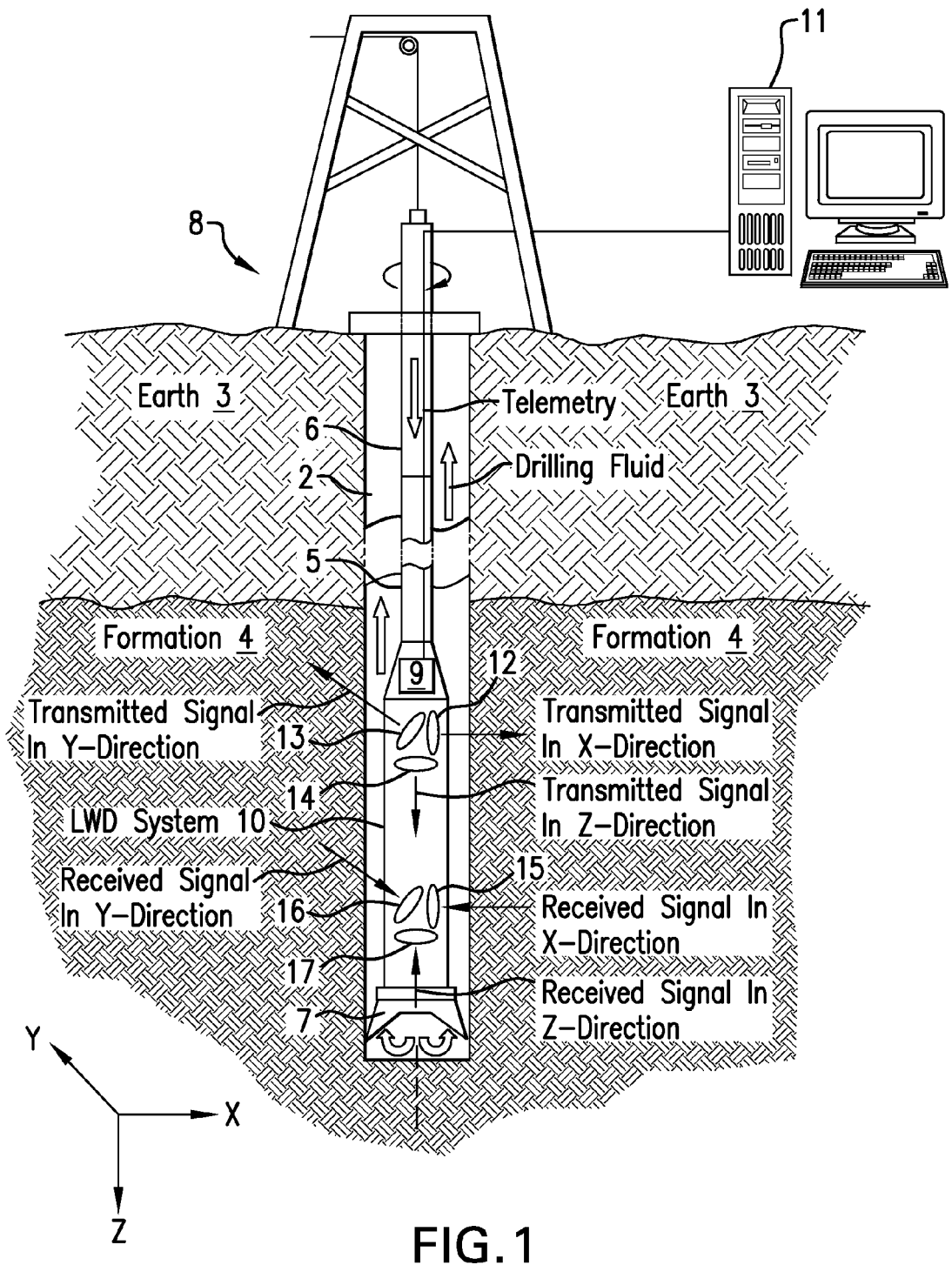
FIG. 1 illustrates a cross-sectional view of an exemplary embodiment of resistivity tool attached to a drill string disposed in a borehole penetrating the earth.

FIG. 1 illustrates a cross-sectional view of an exemplary embodiment of a LWD system 10 disposed in a borehole 2 penetrating the earth 3, which may include an earth formation 4. The LWD system 10 is configured to perform measurements on the formation 4, which may be a function of direction or azimuth, for characterizing the formation 4. The formation 4 represents any subsurface material of interest that may be characterized by the system 10. The LWD system 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 9 are configured to operate the system 10, process measurement data obtained downhole, and/or act as an interface with telemetry to communicate data or commands between downhole components and a computer processing system 11 disposed at the surface of the earth 3. Non-limiting embodiments of the telemetry include pulsed-mud and wired drill pipe. System operation and data processing operations may be performed by the downhole electronics 9, the computer processing system 11, or a combination thereof. Formation characterization measurements are generally performed at a plurality of depths with the measurements being recorded along with a depth at which the measurements were performed to create a log. In one or more embodiments, the log is a graphical representation of measurement value versus depth. In one or more embodiments, changes in measurement values may be presented as an image of the formation.

As illustrated in FIG. 1, the LWD system 10 includes three transmitter transducers 12, 13 and 14. These transmitter transducers have transmission directions that are orthogonal to each other in the X, Y and Z directions. However, the transmission directions do not have to be orthogonal to each other with corrections for non-orthogonality being made by geometric analysis or calibration. The transmitter transducers are configured to transmit a signal into the formation 4. In one or more embodiments, the signal is electromagnetic energy for measuring formation resistivity and the transmitter transducers are antennas such as coils. A coil may be represented as a circle or oval in one or more views. The LWD system 10 also includes three receiver transducers 15, 16 and 17. These receiver transducers have sensitivity directions that are orthogonal to each other in the X, Y and Z directions and align with the transmission directions of the transmitter transducers. For example, the transmission direction of the transmitter transducer 12 and the sensitivity direction of the receiver transducer 17 are both along the X-axis. The receiver transducers are configured to receive a signal from the formation 4 in response to the signal transmitted by the transmitter transducers. In the resistivity imaging embodiment, the receiver transducers are also antennas such as coils. As with the transmitter transducers, the receiver transducers do not have to be orthogonal to each other with corrections for non-orthogonality being made by geometric analysis or field or laboratory calibration.

The electromagnetic energy transmitted into the formation (i.e., transmitted signals) by the transmitter transducers induces circulating electrical currents such as eddy currents in the formation. The circulating currents in turn generate electromagnetic energy (i.e., formation signals), which is received by the receiver transducers. The magnitude of the received signals is indicative of the resistivity or conductivity of the formation. For example, a signal received from a first formation having a higher magnitude (or amplitude) than a signal received from a second formation is indicative of the first formation having a lower resistivity (or higher conductivity) than the resistivity of the second formation. The value of the formation resistivity or conductivity may be obtained by having the system 10 calibrated using sample materials having a known resistivity or by analysis of the transmitted and return signals using known physical relationships (such as Maxwell's equations for example).

It can be appreciated that a transmitted signal may have two components—a tool component and a formation component. The tool component signal is a signal from a transmitter transducer induced in a receiver transducer due to a conductive drill collar or tool structure. The formation signal is a signal from the transmitter transducer induced in a receiver transducer due to the electrical characteristics of the formation. The received formation signal has information for characterizing the formation while the received tool signal does not include formation characterization information and may interfere with the formation signal. After a signal is transmitted, received signals are received over a period of time. "Early" received signals include the tool component signal and the formation signal. "Late" return signals are mostly if not all tool signals because at the late time the formation signal may be considered negligible (e.g., less than 5% of the magnitude of the total signal). The late received signals are used to correct for bending and/or torsion of the drill string and to correct for interference with the formation signals as discussed below.

Figure 2:
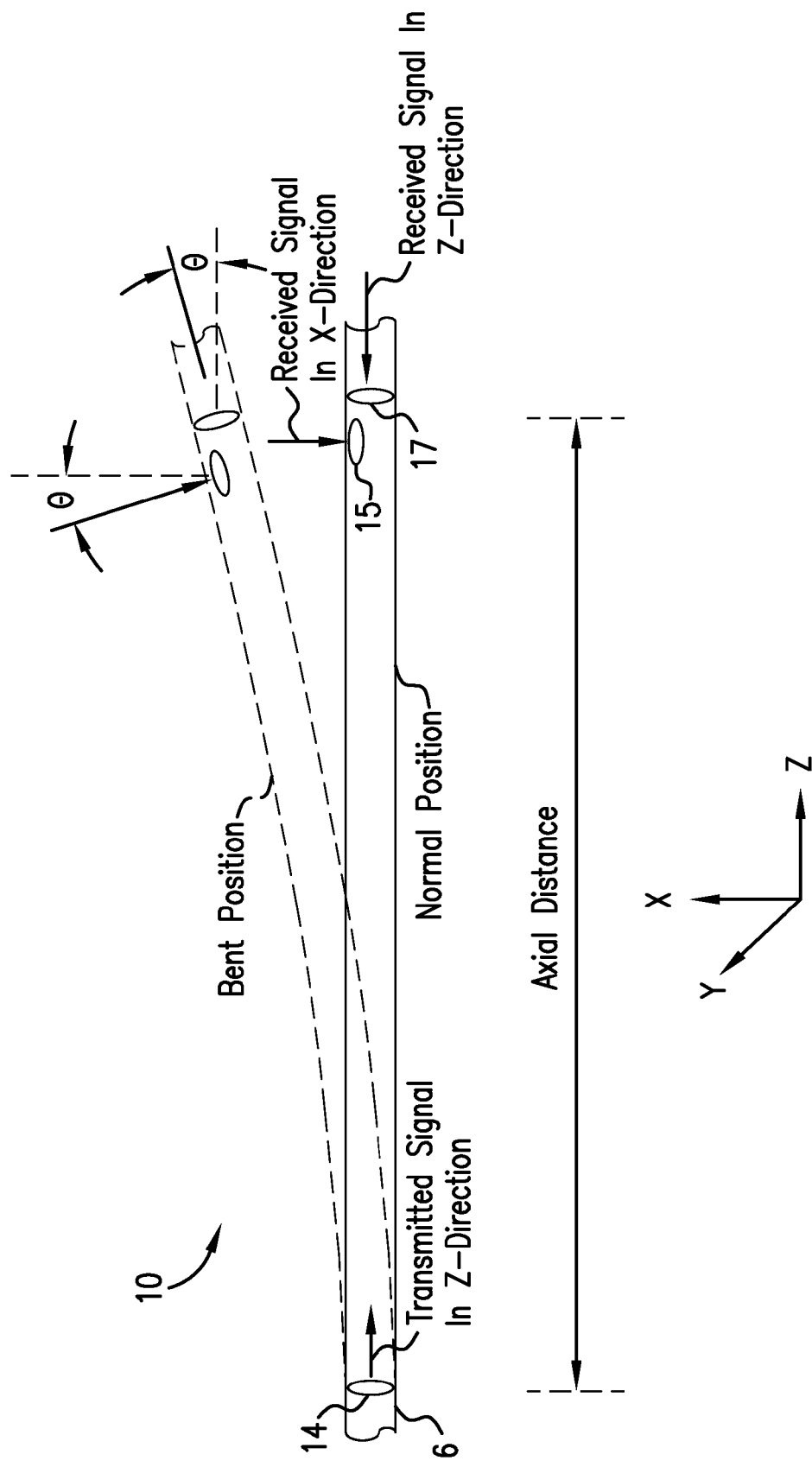
FIG. 2 depicts aspects of drill string undergoing bending.

FIG. 2 depicts aspects of correcting for bending of the drill string 6. For teaching purposes, a "normal" configuration alignment is presented with no bending or torsion where the transmitter transducer 14 (transmission direction along Z-axis), the receiver transducer 15 (direction of sensitivity along X-axis), and the receiver transducer 17 (direction of sensitivity along Z-axis) are illustrated. In the "normal" configuration with no bending, the transmitter transducer 12 transmits a signal in the Z-direction and the receiver transducer 17 receives a late received signal of a certain magnitude from the tool in the Z-direction. Because the receiver transducer 15 has a sensitivity direction that is orthogonal to the transmission direction, there is no received late signal received by the receiver transducer 15 and its output will be zero. As the drill string 6 bends in the X-Z plane, the signal received by the receiver transducer 17 will decrease because the receiver transducer 17 will now have a vector component of the sensitivity direction in the X-plane and a decreased vector component of the sensitivity direction in the Z-direction. Accordingly, the output of the receiver transducer 15 will increase because this transducer will now have a vector component of sensitivity in the Z-direction. The angle θ formed between the transmitter transducer and the receiver transducers as referenced to the normal configuration may be calculated as $\theta = \tan^{-1}(V_{15}/V_{17})$ where $V_{15}$ is the output signal magnitude or amplitude from the receiver transducer 15 and $V_{17}$ is the output signal magnitude or amplitude from the receiver transducer 17. The symbol V relates to a receiver transducer output signal, such as voltage or current amplitude. The corrected signal used to determine the formation property may then be calculated as $V_{15corrected} = V_{15} \cdot \cos(\theta) + V_{17} \cdot \sin(\theta)$ at a particular point in late time t, which marks the end of a time interval over which both formation signals and tool signals were received. In other words, the late signals (tool signals only) are used to correct the early signals (formation signals and tool signals) to remove the influence of drill string bending in determining the formation property. It can be appreciated that the output from the receiver transducer 16 can also be corrected for drill string bending using the above disclosed techniques.

Figure 3A:
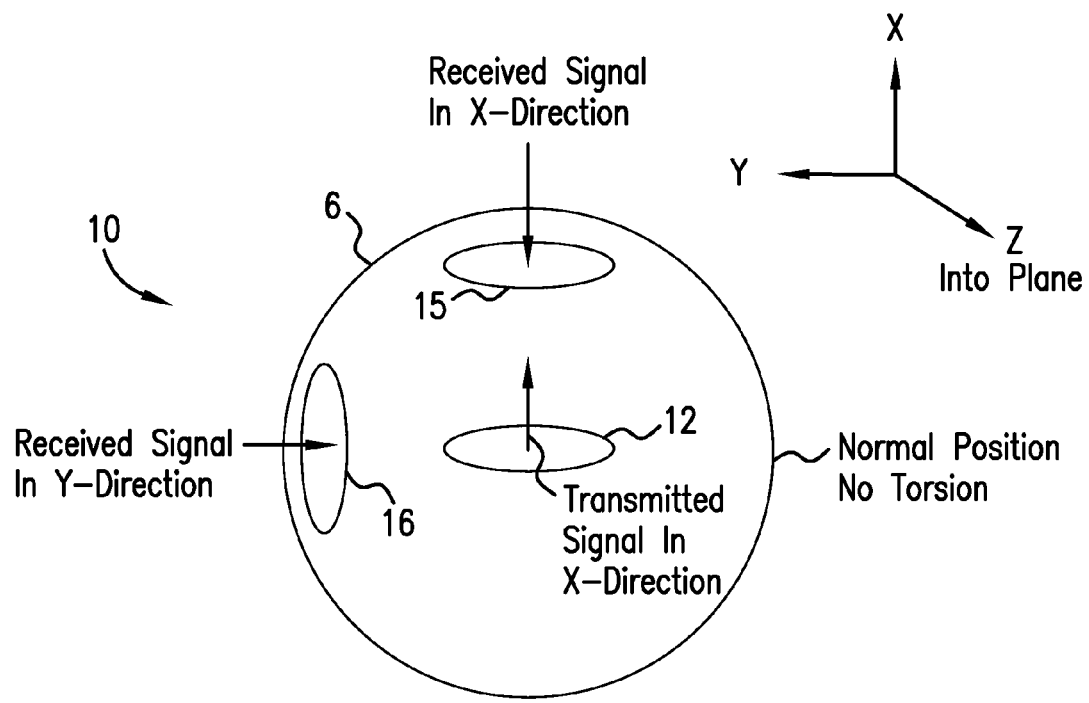
FIGS. 3A and 3B, collectively referred to as FIG. 3, depict aspects of the drill string undergoing torsion.
Figure 3B:
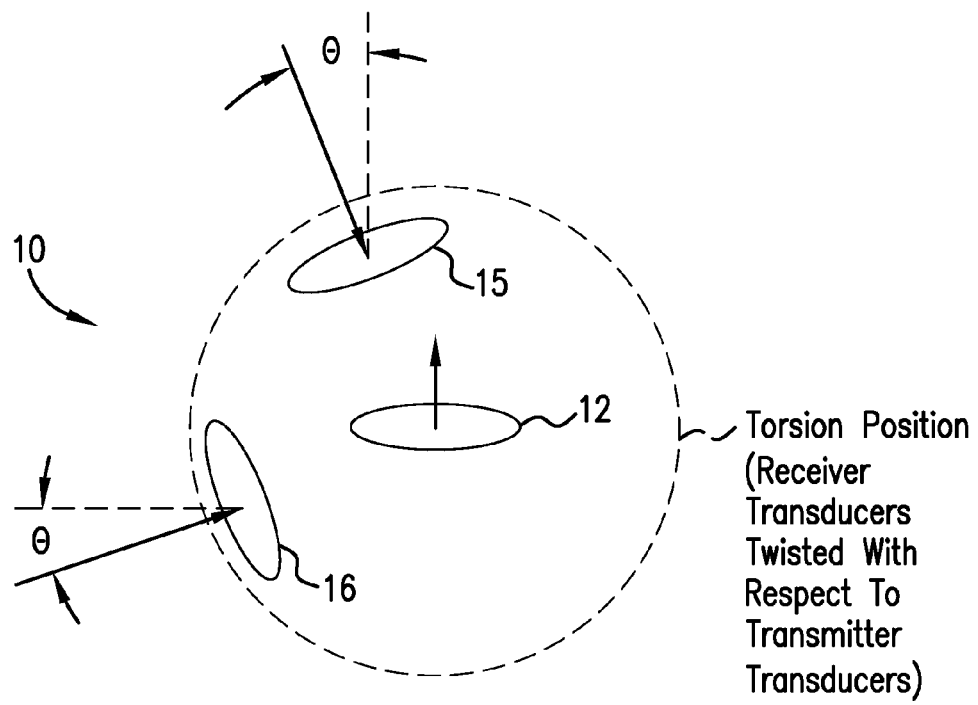

FIG. 3 depicts aspects of correcting for torsion of the drill string 6 as illustrated in top cross-sectional views. In FIG. 3, the transmitter transducer is at one location in the drill string 6 and the receiver transducers are spaced the distance L from the receiver transducers (as illustrated in FIG. 3A). For teaching purposes, a "normal" configuration alignment is illustrated in FIG. 3A with no bending or torsion where the transmitter transducer 12 (direction of transmission along X-axis), the receiver transducer 15 (direction of sensitivity along X-axis), and the receiver transducer 16 (direction of sensitivity along Y-axis) are illustrated. In the "normal" configuration, the transmitter transducer 12 transmits a signal in the X-direction and the receiver transducer 15 receives a late received signal of a certain magnitude from the tool in the X-direction. Because the receiver transducer 16 has a sensitivity direction (i.e., Y-direction) that is orthogonal to the transmission direction (i.e., X-direction), there is no signal received by the receiver transducer 16 and its output will be zero. As the drill string 6 experiences torsion in the X-Y plane as illustrated in FIG. 3B, the magnitude of the signal received by the receiver transducer 15 will decrease because the receiver transducer 15 will now have a vector component of its sensitivity direction in the Y-direction and a decreased vector component of its sensitivity direction in the X-direction. Accordingly, the output of the receiver transducer 16 will increase because this transducer will now have a vector component of sensitivity in the X-direction. The angle θ formed between the transmitter transducer and the receiver transducers as referenced to the normal configuration may be calculated as $\theta=\tan^{-1}(V_{16}N_{15})$ where $V_{15}$ is the output signal magnitude from the receiver transducer 15 and $V_{16}$ is the output signal magnitude from the receiver transducer 16. The corrected signal used to determine the formation property may then be calculated as $V_{16corrected}=V_{16}\cdot\cos(\theta)+V_{15}\cdot\sin(\theta)$ at a particular point in late time t, which marks the end of a time interval over which both formation signals and tool signals were received. In other words, the late signals (tool signals only) are used to correct the early signals (formation signals and tool signals) to remove the influence of drill string torsion in determining the formation property. It can be appreciated that the output from the receiver transducer 15 can also be corrected for drill string torsion using the above disclosed techniques.

Figure 4:
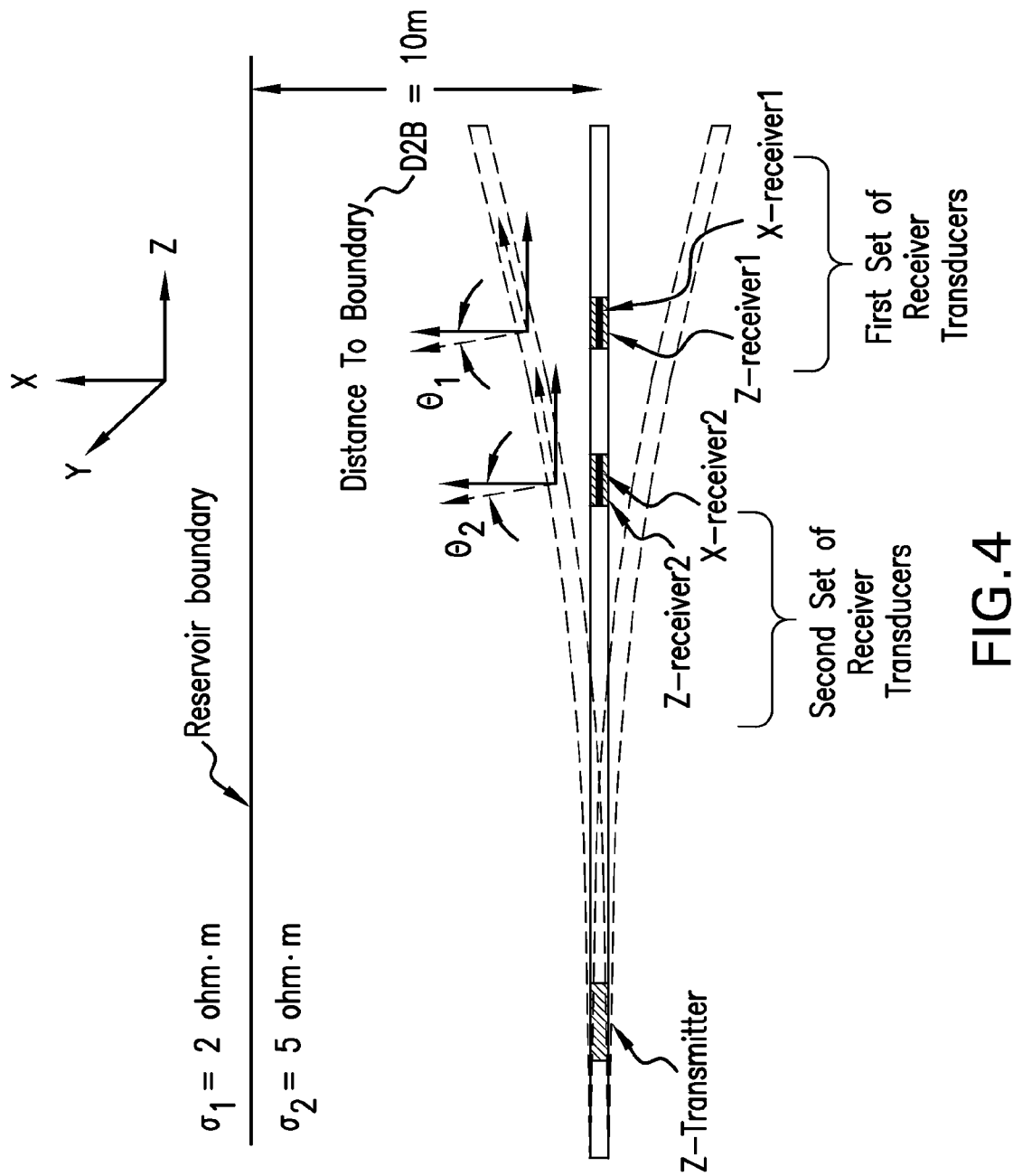
FIG. 4 depicts aspects of the resistivity tool having two set of receiver transducers for correcting for a tool signal.
Figure 5:
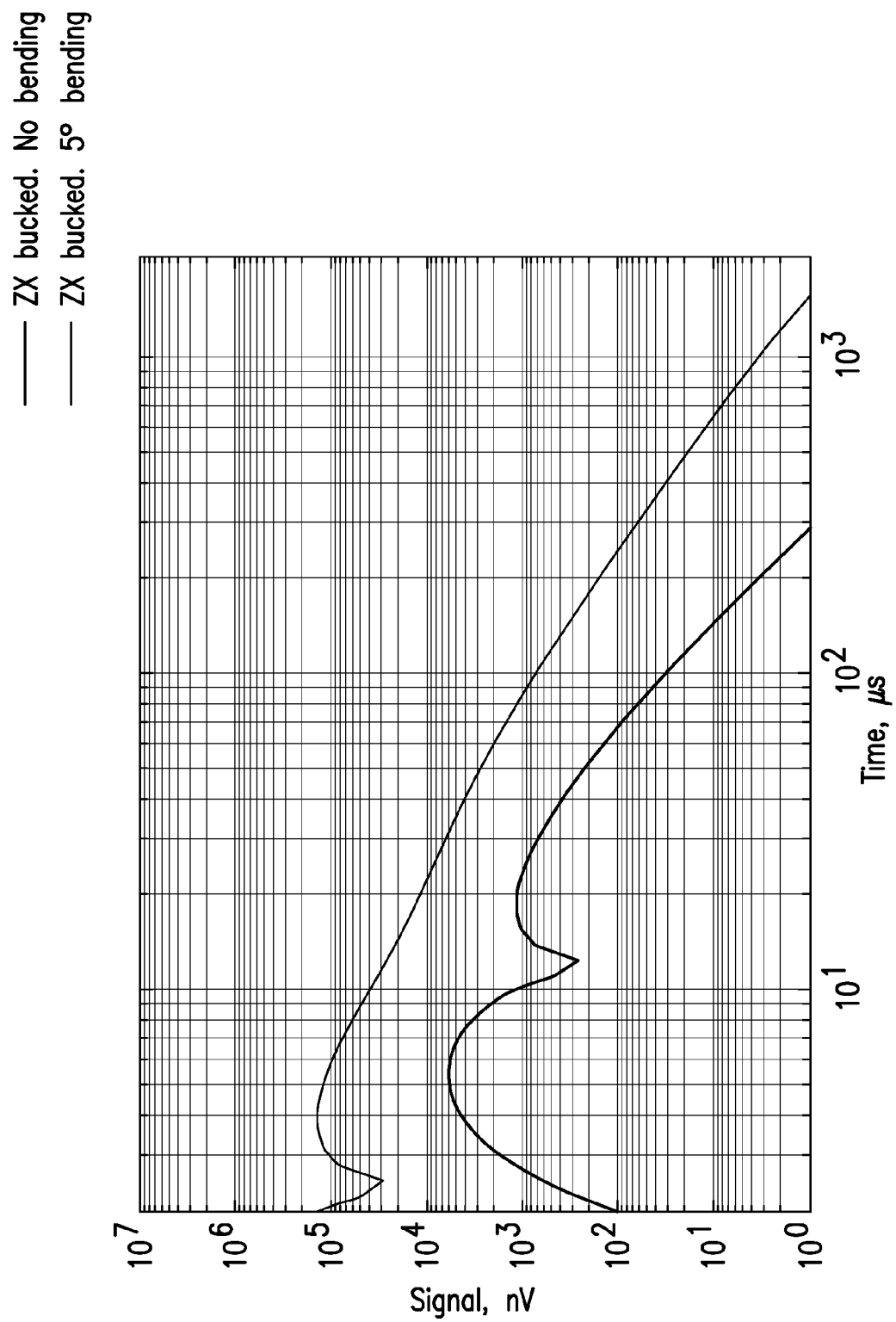
FIG. 5 illustrates a graph of received signal voltage versus time for a receiver antenna oriented in the X-direction receiving a formation signal without drill string bending and with 5° drill string bending.

Next, an exemplary technique for correcting for drill string bending and/or torsion along with correcting for the tool signal is presented. Two sets of receivers, a first set and a second set, are used in this technique as illustrated in FIG. 4. The configuration illustrated in FIG. 4 was used to run computer-simulated modeling of the misalignment and tool signal correction process. The parameters of the model were as follows: 1) the transmitter-receiver spacing in first set of receivers—9 m, 2) the transmitter-receiver spacing in second set of receivers closest to transmitters—6 m, 3) the transmitter dipole moment—30 Am², and 4) the effective area of the receivers—4.6 m² each. FIG. 5 illustrates the ideal ZX signal (signal from Z-transmitter received in X-receiver) due to side boundary of the formation and correcting for the tool signal (the corrected ZX signal may be referred to as ZX bucked as in FIG. 5). This signal is the result of the processing of data from the two X-receivers (due to signal transmitted from the Z-transmitter) according to equation (1) where V represents signal magnitude or amplitude such as voltage or current, subscript ZX represents corrected signal received in X-direction due to signal transmitted in Z-direction, subscript ZX1 represents signal received by normal x-direction receiver transducer in the first set due to signal transmission in Z-direction, and subscript ZX2 represents signal received by normal X-direction receiver in the second set due to signal transmission in Z-direction.

$$V_{ZX}(t) = V_{ZX1}(t) - \int_0^t h^*(t-\tau) \cdot V_{ZX2}(\tau)\, d\tau \qquad (1)$$

The impulse response h*(t) may be used in its simplest form $h^*(t)=x_1\delta(t)$ where $\delta(t)$ is the Dirac delta-function; then substituted into equation (1) to give equation (2).

$$V_{ZX}(t)=V_{ZX1}(t)-x_1\cdot V_{ZX2}(t) \qquad (2)$$

In equation (2), $x_1$ is determined from minimization of $V_{ZZ}(t)=V_{ZZ1}(t)-x_1\cdot V_{ZZ2}(t)$ in the auxiliary time interval $t_i\epsilon\Delta t$ of late times where the tool signal is predominant. In general, the parameter $x_1$ is very close to the ratio, $L_2^3/L_1^3$, where $L_1$ and $L_2$ are the transmitter-to-receiver1 and the transmitter-to-receiver2 distances, respectively. The procedure corresponding to equations (1) and (2) is used to substantially eliminate the tool signal and is referred to as "bucking." FIG. 5 illustrates the ZX signal for 5 degrees bending of the drill string or drill collar (in 9 m between transmitter and receiver1) compared to the no bending case. The bucked signal with the bending of the drill string is also the result of the two-receiver data processing as discussed above.

Figure 6:
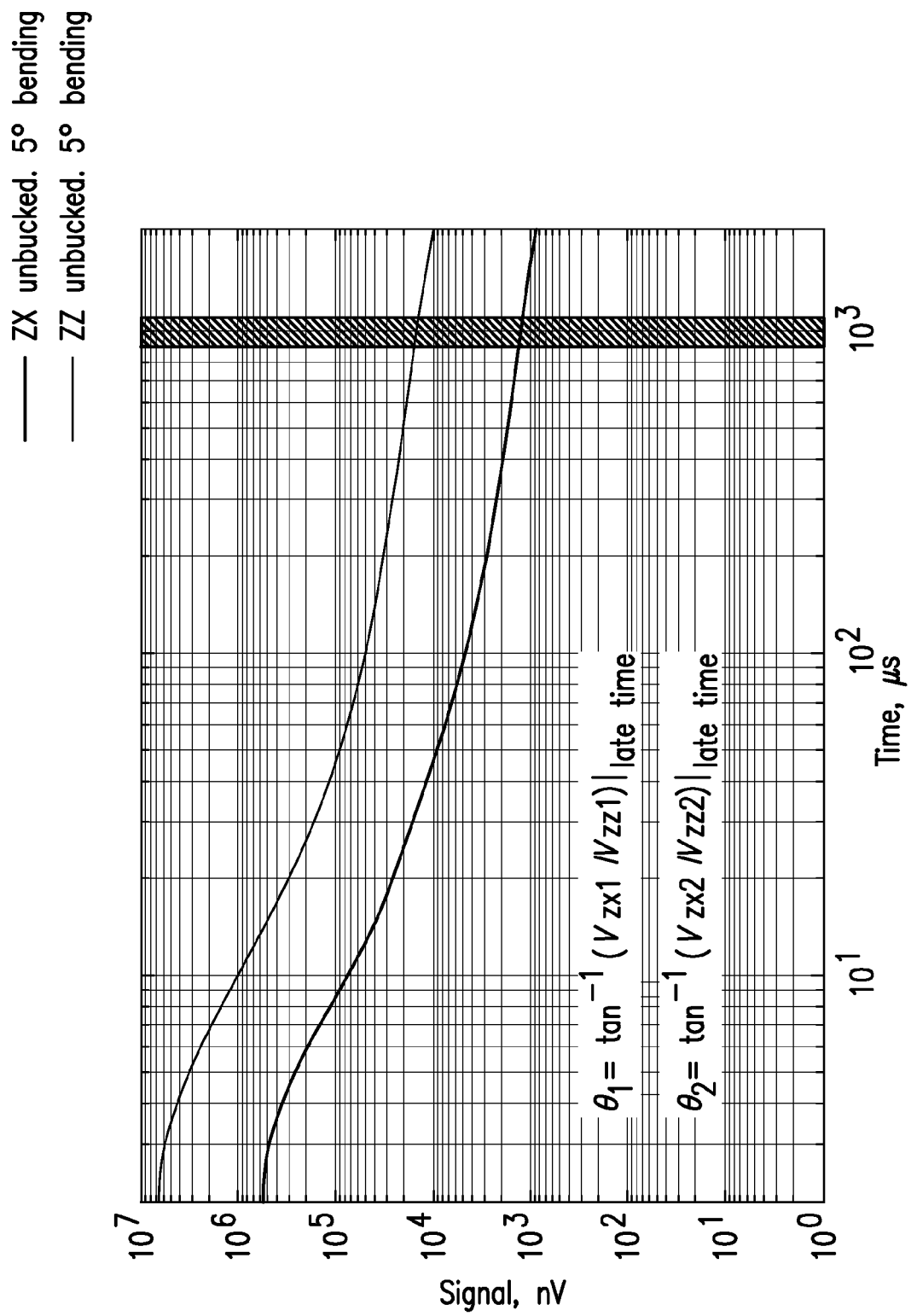
FIG. 6 illustrates a graph of received signal voltage versus time for receiver antennas oriented in the X and Z-directions with drill string signal influence and with 5° drill string bending.

FIG. 6 illustrates the unbucked (i.e., uncorrected) ZX and ZZ signals in the X-receiver1 and Z-receiver1 with 5° bending of the drill string. These signals at a late time acquisition interval are used to calculate the bending angles independently in the two X-receivers according to equations (3) and (4).

$$\theta_1 = \tan^{-1}\left(\frac{V_{ZX1}}{V_{ZZ1}}\right) \qquad (3)$$

$$\theta_2 = \tan^{-1}\left(\frac{V_{ZX2}}{V_{ZZ2}}\right) \qquad (4)$$

The calculated bending angles $\theta_1$ and $\theta_2$ are used to calculate the corrected ZX signals in both X-receivers according to equations (5) and (6).

$$V_{ZX1corrected}=V_{ZX1}\cdot\cos(\theta_1)+V_{ZZ1}\sin(\theta_1) \qquad (5)$$

$$V_{ZX2corrected}=V_{ZX2}\cdot\cos(\theta_2)+V_{ZZ2}\sin(\theta_2) \qquad (6)$$

The corrected two-receiver ZX signal as a function of time (t) (i.e., signal received from X-direction due to signal transmitted in Z-direction) is calculated by substituting the results obtained from equations (5) and (6) into equation (2), thus yielding equation (7). Time t in equation (7) may represent early times, which include the formation signal in order to correct for signals that characterize the formation.

$$V_{ZXcorrected}(t)=V_{ZX1corrected}(t)-x_1\cdot V_{ZX2corrected}(t) \qquad (7)$$

Figure 7:
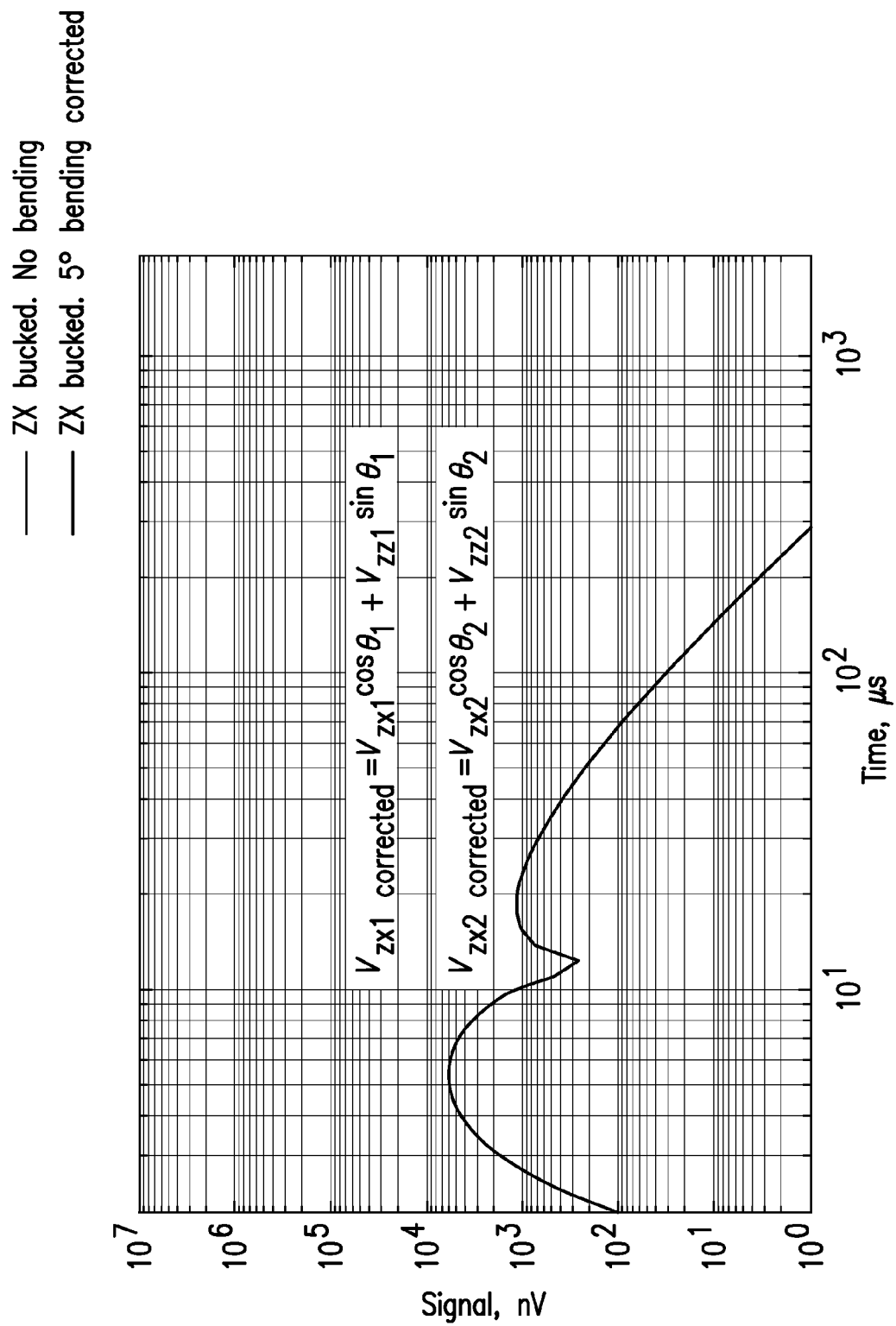
FIG. 7 illustrates a graph of received signal voltage versus time for receiver antennas oriented in the X-direction with signal correction and with 5° drill string bending.

The result of the modeling using equation (7) is illustrated in FIG. 7. It is noted that the ideal signal with no drill string bending and the corrected signal that corrects for drill string bending and the tool signal are practically indistinguishable from each other.

Figure 8:
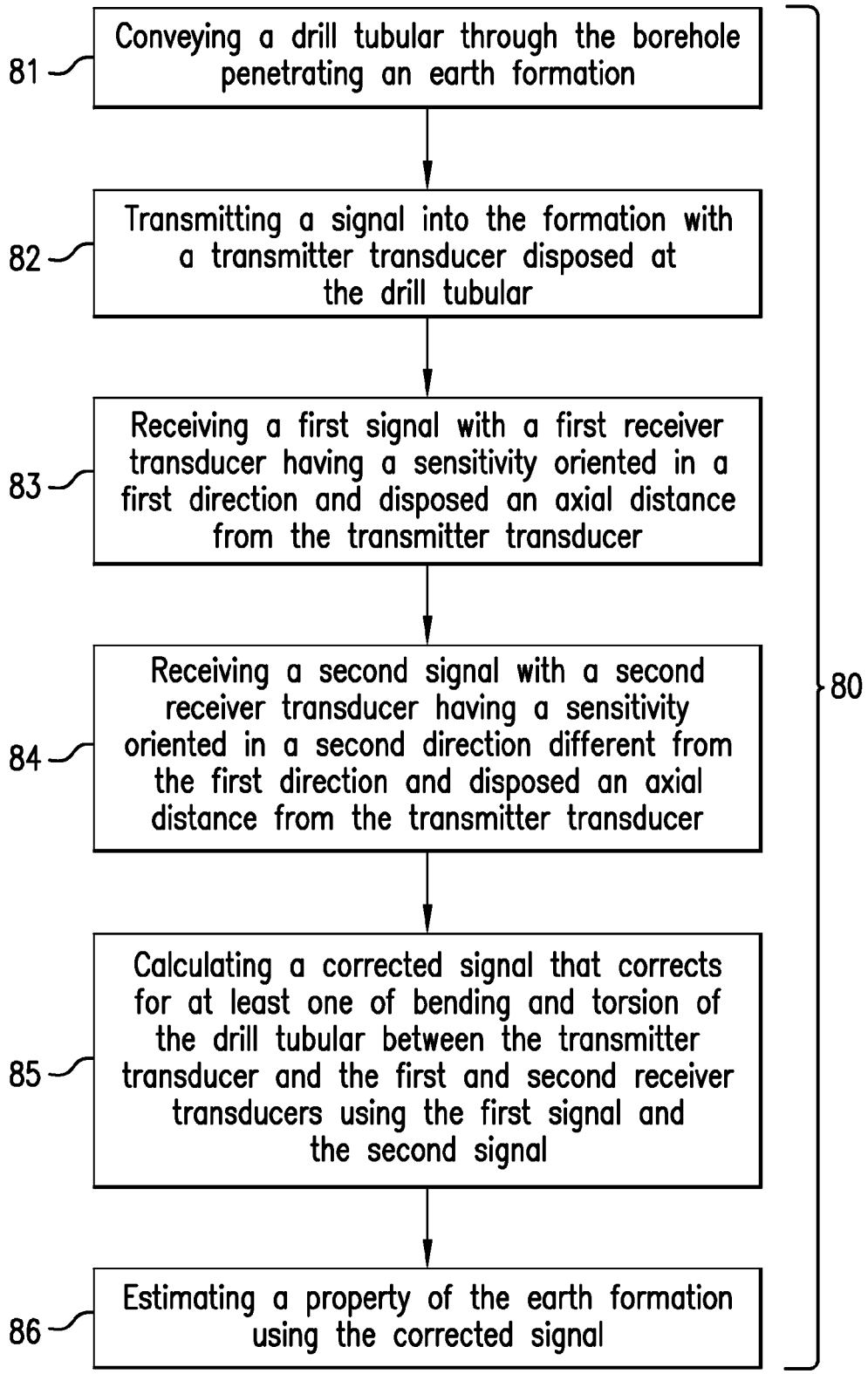
FIG. 8 is a flow chart of a method for estimating a property of an earth formation penetrated by a borehole.

FIG. 8 is a flow chart for a method 80 for estimating a property of an earth formation penetrated by a borehole. Block 81 calls for conveying a drill tubular through the borehole. Block 82 calls for transmitting a signal into the formation with a transmitter transducer disposed at the drill tubular. Block 83 calls for receiving a first signal with a first receiver transducer having a sensitivity oriented in a first direction and disposed an axial distance from the transmitter transducer. The first signal is due to the signal transmitted by the transmitter transducer and includes early signals induced in the first receiver due to the formation and the drill tubular and late signals induced in the first receiver due to predominantly tool signals. Block 84 calls for receiving a second signal with a second receiver transducer having a sensitivity oriented in a second direction different from the first direction and disposed an axial distance from the transmitter transducer. The second signal is also due to the signal transmitted by the transmitter transducer and includes early signals induced in the second receiver due to the formation and the drill tubular and late signals induced in the second receiver due to predominantly to the drill tubular. Block 85 calls for calculating a corrected signal that corrects for at least one of bending and torsion of the drill tubular between the transmitter transducer and the first and second receiver transducers using the first signal and the second signal. Block 86 calls for estimating the property using the corrected signal.

It can be appreciated that the above techniques are also applicable to correcting for drill string torsion and the tool signal and that the equations for this correction are similar to equations (1)-(7). It can be appreciated that correction for drill string torsion, correction for drill string bending, and correction for the tool signal may be performed sequentially or simultaneously. It can be appreciated that correction for drill string bending and the tool signal may be performed when the bending has vector components in the X-direction and the Y-direction. It can be appreciated that the above techniques can be used to correct for the drill string experiencing both bending and torsion. It can be appreciated that the above disclosed techniques may also be employed in LWD tools to transmit and receive forms of energy other than electromagnetic energy.

The above disclosed techniques provide several advantages. One advantage is that sensors such as accelerometers, magnetometers, or strain gauges, which may be used to measure drill string bending or torsion, are not required. Further, support for these sensors such as power and data acquisition channels are not required thus not requiring additional space in a downhole tool where space may be limited due to borehole spaced constraints.

In support of the teachings herein, various analysis components may be used, including a digital and/or an analog system. For example, the downhole electronics 9, the computer processing system 11, or the LWD system 10 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottomhole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a property of an earth formation penetrated by a borehole, the method comprising:
conveying a drill tubular through the borehole;
transmitting a transient signal into the formation with a transmitter transducer disposed at the drill tubular;
receiving a first signal with a first receiver transducer having a sensitivity oriented in a first direction and disposed an axial distance from the transmitter transducer;
receiving a second signal with a second receiver transducer having a sensitivity oriented in a second direction different from the first direction and disposed an axial distance from the transmitter transducer;
calculating a corrected signal that corrects for at least one of bending and torsion of the drill tubular between the transmitter transducer and the first and second receiver transducers using the first signal and the second signal; and estimating the property using the corrected signal.

2. The method according to claim 1, wherein the corrected signal is further derived from a change in at least one of the first signal and the second signal.

3. The method according to claim 1, wherein the second direction is orthogonal to the first direction.

4. The method according to claim 3, wherein the transmitter transducer and the first receiver transducer are oriented in the same direction and angle θ of at least one of the bending and the torsion of the drill string is calculated by solving:
$\theta = \tan^{-1}(V_2/V_1)$ where $V_2$ represents signal magnitude of the second receiver transducer and $V_1$ represents signal magnitude of the first receiver transducer.

5. The method according to claim 4, wherein the property is estimated by solving $V_{2corrected} = V_2 \cdot \cos(\theta) + V_1 \cdot \sin(\theta)$ where $V_{2corrected}$ represents the corrected signal.

6. The method according to claim 1, wherein:
the property is resistivity;
the transmitted transient signal, the first signal, and the second signal comprise electromagnetic energy; and
the transmitter transducer, the first receiver transducer, and the second receiver transducer each comprise a separate antenna.

7. The method according to claim 1, wherein:
the first receiver transducer comprises a third receiver transducer and a fourth receiver transducer separated an axial distance from each other to one side of the transmitter transducer;
the second receiver transducer comprises a fifth receiver transducer and a sixth receiver transducer separated an axial distance from each other to the same side of the transmitter transducer as the third and fourth receiver transducers;
the third and fifth receiver transducers are closer to the transmitter transducer than the fourth and sixth receiver transducers;
the third and fourth receiver transducers have a same direction of sensitivity, and the fifth and sixth receiver transducers have a same direction of sensitivity that is different from the direction of sensitivity of the third and fourth receiver transducers; and
the corrected signal further corrects for an amount of signal propagation directly from the transmitter transducer through the drill tubular to the fifth and sixth receiver transducers using an output from each of the third, fourth, fifth and sixth receiver transducers.

8. The method according to claim 7, wherein the direction of sensitivity of the third and fourth receiver transducers is orthogonal to the direction of sensitivity of the fifth and sixth receiver transducers, a direction of transmission of the transmitter transducer is the same as the direction of sensitivity of the third and fourth receiver transducers, and the corrected signal is calculated by solving:

$$\theta_1 = \tan^{-1}\left(\frac{V_{ZX1}}{V_{ZZ1}}\right);$$

$$\theta_2 = \tan^{-1}\left(\frac{V_{ZX2}}{V_{ZZ2}}\right);$$

$$V_{ZX1corrected} = V_{ZX1} \cdot \cos(\theta_1) + V_{ZZ1} \sin(\theta_1)$$

$$V_{ZX2corrected} = V_{ZX2} \cdot \cos(\theta_2) + V_{ZZ2} \sin(\theta_2)$$

$$V_{ZXcorrected}(t) = V_{ZX1corrected}(t) - x_1 \cdot V_{ZX2corrected}(t)$$

where $V_{ZX1}$ represents signal magnitude of the sixth receiver transducer; $V_{ZZ1}$ represents signal magnitude of the fourth receiver transducer; $V_{ZX2}$ represents signal magnitude of the fifth receiver transducer; $V_{ZZ2}$ represents signal magnitude of the third receiver transducer; $V_{ZX1corrected}$ represents a corrected signal of the sixth receiver transducer, $V_{ZX2corrected}$ represents a corrected signal of the fifth receiver transducer; $V_{ZXcorrected}$ represents a corrected signal received in the same direction as the direction of sensitivity of the fifth and sixth receiver transducers; t represents time, and $x_1$ is a coefficient for reducing an amount of direct signal propagation from the transmitter transducer through the drill tubular.

9. The method according to claim 8, wherein the property is resistivity;
the transmitted transient signal, the first signal, and the second signal comprise electromagnetic energy; and
the transmitter transducer, the first receiver transducer, and the second receiver transducer each comprise a separate antenna.

10. An apparatus for estimating a property of an earth formation penetrated by a borehole, the apparatus comprising:
a drill tubular configured to be conveyed through the borehole;
a transmitter transducer disposed at the drill tubular and configured to transmit a transient signal towards the earth formation;
a first receiver transducer disposed at the drill tubular a first axial distance from the transmitter transducer, having a first direction of sensitivity, and configured to receive a first signal related a transmission signal;
a second receiver transducer disposed at the drill tubular a second axial distance from the transmitter transducer that is less than the first axial distance, having a second direction of sensitivity that is different from the first direction of sensitivity, and configured to receive a second signal related to the transmission signal; and
a processor configured to calculate a corrected signal that corrects for at least one of bending and torsion of the drill tubular between the transmitter transducer and the first and second receiver transducers using the first signal and the second signal, and to estimate the property using the corrected signal.

11. The apparatus according to claim 10, wherein the processor is further configured to calculate the corrected signal from a change in at least one of the first signal and the second signal.

12. The apparatus according to claim 10, wherein the second direction is orthogonal to the first direction.

13. The apparatus according to claim 12, wherein the transmitter transducer and the first receiver transducer are oriented in the same direction and angle θ of at least one of the bending and the torsion of the drill string is calculated by solving:
$\theta = \tan^{-1}(V_2/V_1)$ where $V_2$ represents signal intensity of the second receiver transducer and $V_1$ represents signal intensity of the first receiver transducer.

14. The apparatus according to claim 13, wherein the property is estimated by solving $V_{2corrected} = V_2 \cdot \cos(\theta) + V_1 \sin(\theta)$ where $V_{2corrected}$ represents the corrected signal obtained from the second transducer.

15. The apparatus according to claim 10, wherein:
the property is resistivity;
the transmitted transient signal, the first signal, and the second signal comprise electromagnetic energy; and the transmitter transducer, the first receiver transducer, and the second receiver transducer each comprise a separate antenna.

16. The apparatus according to claim 10, wherein:
the first receiver transducer comprises a third receiver transducer and a fourth receiver transducer separated an axial distance from each other to one side of the transmitter transducer;
the second receiver transducer comprises a fifth receiver transducer and a sixth receiver transducer separated an axial distance from each other to the same side of the transmitter transducer as the third and fourth receiver transducers;
the third and fifth receiver transducers are closer to the transmitter transducer than the fourth and sixth receiver transducers;
the third and fourth receiver transducers have a same direction of sensitivity, and the fifth and sixth receiver transducers have a same direction of sensitivity that is different from the direction of sensitivity of the third and fourth receiver transducers; and
the corrected signal further corrects for an amount of signal propagation directly from the transmitter transducer through the drill tubular to the fifth and sixth receiver transducers using an output from each of the third, fourth, fifth and sixth receiver transducers.

17. The apparatus according to claim 16, wherein the direction of sensitivity of the third and fourth receiver transducers is orthogonal to the direction of sensitivity of the fifth and sixth receiver transducers, a direction of transmission of the transmitter transducer is the same as the direction of sensitivity of the third and fourth receiver transducers, and the corrected signal is calculated by solving:

$$\theta_1 = \tan^{-1}\left(\frac{V_{ZX1}}{V_{ZZ1}}\right);$$

$$\theta_2 = \tan^{-1}\left(\frac{V_{ZX2}}{V_{ZZ2}}\right);$$

$$V_{ZX1corrected} = V_{ZX1} \cdot \cos(\theta_1) + V_{ZZ1} \sin(\theta_1)$$

$$V_{ZX2corrected} = V_{ZX2} \cdot \cos(\theta_2) + V_{ZZ2} \sin(\theta_2)$$

$$V_{ZXcorrected}(t) = V_{ZX1corrected}(t) - x_1 \cdot V_{ZX2corrected}(t)$$

where $V_{ZX1}$ represents signal magnitude of the sixth receiver transducer; $V_{ZZ1}$ represents signal magnitude of the fourth receiver transducer; $V_{ZX2}$ represents signal magnitude of the fifth receiver transducer; $V_{ZZ2}$ represents signal magnitude of the third receiver transducer; $V_{ZX1corrected}$ represents a corrected signal of the sixth receiver transducer, $V_{ZX2corrected}$ represents a corrected signal of the fifth receiver transducer; $V_{ZXcorrected}$ represents a corrected signal received in the same direction as the direction of sensitivity of the fifth and sixth receiver transducers; t represents time, and $x_1$ is a coefficient for reducing an amount of direct signal propagation from the transmitter transducer through the drill tubular.

18. The apparatus according to claim 17, wherein the property is resistivity;
the transmitted transient signal, the first signal, and the second signal comprise electromagnetic energy; and
the transmitter transducer, the first receiver transducer, and the second receiver transducer each comprise a separate antenna.

19. The apparatus according to claim 10, wherein:
the transmitter transducer comprises three transmitter transducers, each transmitter transducer having a transmitting direction that is orthogonal to the transmitting directions of the other transmitter transducers;
the apparatus further comprises a third receiver transducer, each receiver transducer having a direction of sensitivity that is orthogonal to the directions of sensitivity of the other receiver transducers and in alignment with the corresponding transmitting directions of the transmitter transducers; and
the processor is further configured to calculate the corrected signal using a combination of one selected transmitter transducer and two selected receiver transducers.

20. A non-transitory computer-readable medium comprising computer-executable instructions for estimating a property of an earth formation penetrated by a borehole by implementing a method comprising:
transmitting a transient signal into the formation with a transmitter transducer disposed at a drill tubular disposed in the borehole;
receiving a first signal with a first receiver transducer having a sensitivity oriented in a first direction and disposed an axial distance from the transmitter transducer;
receiving a second signal with a second receiver transducer having a sensitivity oriented in a second direction different from the first direction and disposed an axial distance from the transmitter transducer;
calculating a corrected signal that corrects for at least one of bending and torsion of the drill tubular between the transmitter transducer and the first and second receiver transducers using the first signal and the second signal; and
estimating the property using the corrected signal.

* * * * *